United States Patent [19]

Ellis

[11] 4,162,058

[45] Jul. 24, 1979

[54] RESILIENT SEATED GATE VALVE WITH IMPROVED SEAT ARRANGEMENT

[75] Inventor: Daniel A. Ellis, Decatur, Ill.

[73] Assignee: Mueller Co., Decatur, Ill.

[21] Appl. No.: 798,686

[22] Filed: May 19, 1977

[51] Int. Cl.² ............................................. F16K 3/314
[52] U.S. Cl. ...................................... 251/326; 251/328
[58] Field of Search ........................ 251/326, 327, 328

[56] References Cited

U.S. PATENT DOCUMENTS

| 3,085,784 | 4/1963 | Dumm .............................. 251/358 X |
| 3,333,816 | 8/1967 | Williams et al. ..................... 251/327 |
| 3,662,778 | 5/1972 | Leopold, Jr. et al. ............. 251/326 X |
| 3,957,245 | 5/1976 | Daghe .............................. 251/326 X |
| 3,963,214 | 6/1976 | Hackman et al. ..................... 251/326 |

FOREIGN PATENT DOCUMENTS

| 1163626 | 2/1964 | Fed. Rep. of Germany ........... 251/327 |
| 1922516 | 11/1969 | Fed. Rep. of Germany ........... 251/326 |

*Primary Examiner*—Arnold Rosenthal
*Attorney, Agent, or Firm*—Cushman, Darby & Cushman

[57] ABSTRACT

A gate valve structure for use in mains carrying fluids, the gate valve structure being provided with an improved valve seat arrangement. The gate valve includes a casing having an unobstructed through-bore and a substantially rectangular shape or elongated chamber communicating with the through-bore in which a gate or disc member reciprocates between closed and opened positions of the valve. The valve casing is provided with a valve seat surrounding one of the ports in the casing defined at the intersection of the through-bore by the elongated chamber, the valve seat lying generally in a plane which converges at an acute angle to a plane normal to the axis of the through-bore and the seat has an upper planar portion facing the other of the ports except at the bottom portion where it merges smoothly into and forms a portion of the unobstructed through-bore. The gate member is provided with a resilient seal member for seating on the valve seat, the seal member having a configuration to conform to the seat so that the seal member is not damaged during opening or closing of the valve by edges in the interior of the valve resulting from the machining of the valve seat. Further, because of the irregular shape of the resilient seal member, means are provided so that the seal member may be properly oriented onto the gate member during assembly and the gate member is provided with ears which cooperate with guideways in the valve casing in such a manner as to minimize rock of the gate member during opening and closing of the valve regardless of the direction of flow of fluid through the valve and, thus, eliminating problems resulting in damaging of the resilient seal member from the wedging action in closing.

20 Claims, 10 Drawing Figures

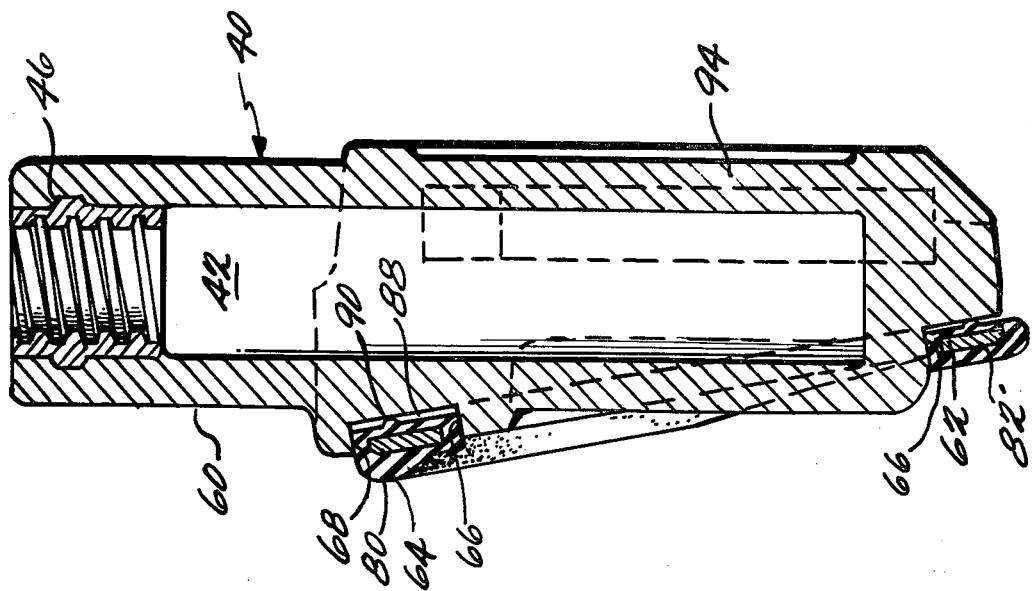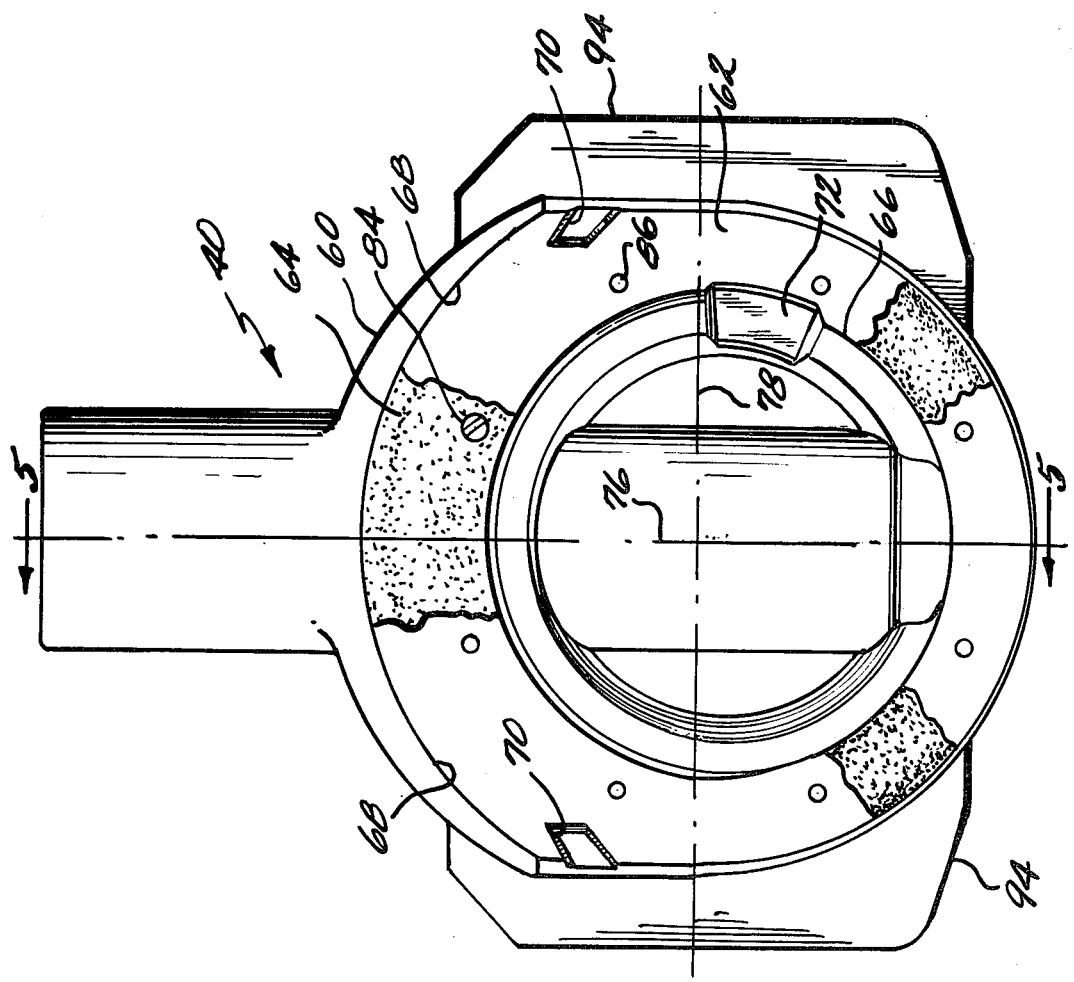

RESILIENT SEATED GATE VALVE WITH IMPROVED SEAT ARRANGEMENT

The present invention relates to an improved gate valve structure and, more particularly, to a gate valve structure having an improved seat arrangement including a machined valve seat in the valve casing surrounding one of the ports in the through-bore and lying generally in a plane which converges at an acute angle to a plane normal to the axis of the through-bore and to an improved annular resilient seal member carried by the body member of the gate member for engaging and sealing with the valve seat. The particular configuration of the valve seat and the annular resilient seal member and its mounting on the body member of the gate member obviates damage to the annular seal member caused by the wedging action of the same when making a seal to close the gate valve.

BACKGROUND OF THE INVENTION

Heretofore, gate valves utilizing a reciprocating gate member have included a cast body member having a through-bore and a valve seat machined therein surrounding one of the ports in the through-bore and a bonnet attached to the body member which provides a chamber open to the through-bore and which contains the rising or non-rising valve stem for the gate member and space for the gate member when the valve is open. One such prior type of gate valve structure is that shown in the Common Assignees prior U.S. Pat. No. 3,662,778, issued May 16, 1972 to Leopold, Jr. et al. This type of gate valve included a gate member which was reciprocated from an open position where the gate member was out of the through-bore and the through-bore was completely unobstructed to thereby reduce turbulence and currents within the valve structure and provide for smoother flow with less pressure drop, to a position across the through-bore so as to close the valve. While the gate valve was of the resilient seated type in that the gate member was provided with a resilient covering, the valve seat was of a rather complicated shape and required an expensive operation to machine the same and, in fact, involved certain manufacturing difficulties since machining was accomplished either through the opening in the upper part of the casing or through the ports of the through-bore.

More recently, gate valve structures have been developed such as those disclosed in the Common Assignees prior U.S. Pat. No. 3,963,214, issued June 15, 1976 to Hackman et al. This type of gate valve included a valve seat surrounding one of the ports in the through-bore and lying generally in a plane converging at an acute angle to a plane normal to the axis of the through-bore. The patent included a gate member having an annular seal member thereon, the seal member having a bulbous portion surrounding its entire periphery for engaging the valve seat, the valve seat having a planar surface facing the other port and a bottom surface merging into and forming part of the through-bore. However, it has been found that difficulties are encountered with this type of seat arrangement as an edge is created at the intersect of the seat with the area of the casing surrounding the through-bore and as a result of the uniformed shaped annular seal member, the same dragged across this edge resulting in tearing or cutting of the same during closing and opening of the valve and particularly in closing when a wedging action is created on the upper portion of the annular seal member as the lower portion is placed under compression with the bottom of the through-bore. The valve casing in this prior art type of gate valve was formed of two body members which were split on a plane normal to the axis of the through-bore, the two body members being secured to each other to define the chamber and the through-bore and one body member contained the valve seat. It was thought that by providing the valve casing split in this manner it would be easier to machine the valve seat in one of the body members. However, such machining of this type of seat can be accomplished in the conventional type of gate valve wherein the valve casing includes a body member defining the seat and the through-bore and a bonnet for defining the chamber for the valve operating mechanism and for the gate member when the valve is in the open position.

The gate member of the gate valve structure disclosed in the aforementioned U.S. Pat. No. 3,963,214 provided an arcuate shoulder which axially extended from the planar seating surface for the annular seal member, the arcuate shoulder being arranged to enclose the outer periphery of the annular seal member on its upper portion. With such an arrangement and since there was wedging action created during closing on the upper portion of the seal member, this wedging action was somewhat like a shearing action and consequently, there was a flow of the resilient seal member. However, this flow was such that it could not take place within the shoulder area and since there was no place for the material of the seal member to go, it was cut on the sharp circumferential ends of the arcuate shoulder. This results in the valve having a damaged sealing surface on the seal member after a number of openings and closings, thus, requiring the seal member to be changed. This damage to the seal member was in addition to the damage caused by the seal member dragging across the edge created during the machining of the valve seat.

PRIOR ART

The following patents represent prior art disclosing gate valve structures wherein the valve seat is arranged to lie generally in a plane which converges at an angle to a plane normal to the axis of the through-bore and wherein the gate member is provided with a resilient annular seal member.

| U.S. PATENTS | | |
| --- | --- | --- |
| 1,557,926 | Dopp | October 20, 1925 |
| 2,194,261 | Allen | March 19, 1940 |
| 2,870,987 | Greenwood | January 27, 1959 |
| 3,316,929 | Milette | May 2, 1967 |
| 3,434,693 | Britton | March 25, 1969 |
| FOREIGN PATENT | | |
| 1,600,753 | German | January 8, 1970 |

BRIEF SUMMARY OF THE INVENTION

The gate valve structure of the present invention is primarily utilized for mains carrying fluid under pressure such as mains in a water distribution system. While the gate valve structure may be utilized for small diameter water mains, it may also be utilized in large diameter mains and it is designed so that it can be inserted into the main with the valve seat, either positioned upstream or downstream of the gate member without effecting the valves operation in closing off the water distribution system. While the gate valve structure is primarily intended for use in water distribution systems, it may also be used in fluid distribution systems such as chemical, steam, gas, oil or the like, it being understood that the various parts of the gate valve structure must be made from or coated with materials to inhibit possible corrosive action within the valve structure depending upon the type of fluid used in the system.

The gate valve structure of the present invention includes a valve casing having a through-bore for the flow of fluid, an elongated chamber intersecting the through-bore intermediate its ends and defining in the through-bore inlet and outlet ports to the chamber, one of the inlet or outlet ports being surrounded by a valve seat which lies generally in a plane converging at an acute angle to a plane normal to the axis of the through-bore. The valve seat has an upper planar portion facing toward the other of the ports and it merges at its lower portion into and forms a portion of the through-bore so that the through-bore is unobstructed. A generally flat gate member reciprocates in the elongated chamber from a closed position across the through-bore and seating against the valve seat to an open position out of the through-bore. The gate member includes a body member having an annular resilient seal member generally rectangular in radial section mounted thereon, the annular seal member having a bulbous portion extending axially therefrom for engaging the planar portion of the valve seat, the bulbous portion of the seal member having a maximum axial thickness adjacent its upper portion in a plane extending through an axis of movement of the gate member. The bulbous portion of the annular resilient seal member merges into the rectangular lower portion of the seal member and the minimum axial thickness of the seal member is at the lower portion in the same plane as the maximum thickness. Means are provided for retaining the seal member on the body member and valve stem means are operatively connected to the gate member and extend through the valve casing, the valve stem means being operative to move the gate member between closed and opened positions.

By providing an annular resilient seal member with a bulbous portion extending axially of the same in the upper portion thereof and the bulbous portion then merging into the rectangular cross-sectional configuration thereof, the annular seal member does not have its sealing surface marred by the shearing action of contact with the valve seat in the area of where an edge is formed during the machining operation of the valve seat. Such arrangement still provides for sufficient pressure between the annular seal member and the valve seat regardless of whether it is in the portion of the seal member which is provided with an axial wedging action, namely, the upper portion of the annular seal member or the lower portion of the annular seal member where the sealing action is compression.

Another aspect of the present invention is to provide a recess about the outer periphery of the valve seat in the area of the top of the same so that the large amount of squeeze or wedging action encountered by the seal member in this area does not result in damage to the same by the sharp edge located at this point of the valve seat.

Still another aspect of the present invention is to provide an annular seal member for a gate valve which has a non-uniform shape and consequently, must be accurately positioned on the gate member, thus, means are provided to ensure proper orientation of the seal member during assembly of the gate member.

A further aspect of the present invention is to provide means on the body member of said gate member to accommodate for flow of the annular resilient seal member in an area adjacent to the circumferential ends of the arcuate shaped shoulder which extends about the outer periphery of the upper portion of the annular seal member. The means includes providing recesses adjacent to the circumferential ends of the arcuate shoulder.

Another aspect of the present invention is providing the resilient annular seal member of the gate member with an embedded reinforcing member. In this respect, an annular steel reinforcing ring is embedded into the resilient seal member when the member is molded and the ring provides a means for discriminately applying pressure to seal member when it is attached to the body member of the gate member and for subsequent adjustment thereof. A plurality of screws extending through holes provided in the steel reinforcing member and received in tapped holes on the body member can be individually adjusted to apply pressure at discrete points around the flat steel reinforcing member and, thus, the sealing contact of the seal member with the valve seat may be adjusted at assembly of the gate valve and after use of the gate valve.

Ancillary to the above, the annular seal member seats on a planar surface on the gate member and in order to provide a good seat, the back face of the annular seal member is provided with an annular bead so as to initially provide line contact when the screws attach the seal member to the body member of the gate member.

Another aspect of the present invention which further ensures excellent sealing of the gate valve when in the closed position and also ensures less damage to the seating surface of the annular seal member is the provision of ears operating in guideways in the valve casing, the ears on the gate member having a length which extends almost to the bottom of the gate member so that the rocking of the gate member upon closing or opening is reduced to a minimum. Additionally, the width of the guideways and the width of the ears is carefully controlled to eliminate disc rattle when the gate member is in the open position.

These and other features and advantages of the present invention will appear more fully in the following Detailed Description of the Invention when taken with reference to the drawings.

BRIEF DESCRIPTION OF THE DRAWINGS

FIG. 4 is an enlarged side elevational view of the gate member with a portion of the annular resilient seal member broken away.

FIG. 5 is a vertical sectional view of the gate member of FIG. 4 taken substantially on the line 5—5 of FIG. 4.

DETAILED DESCRIPTION OF THE INVENTION

Figure 1:
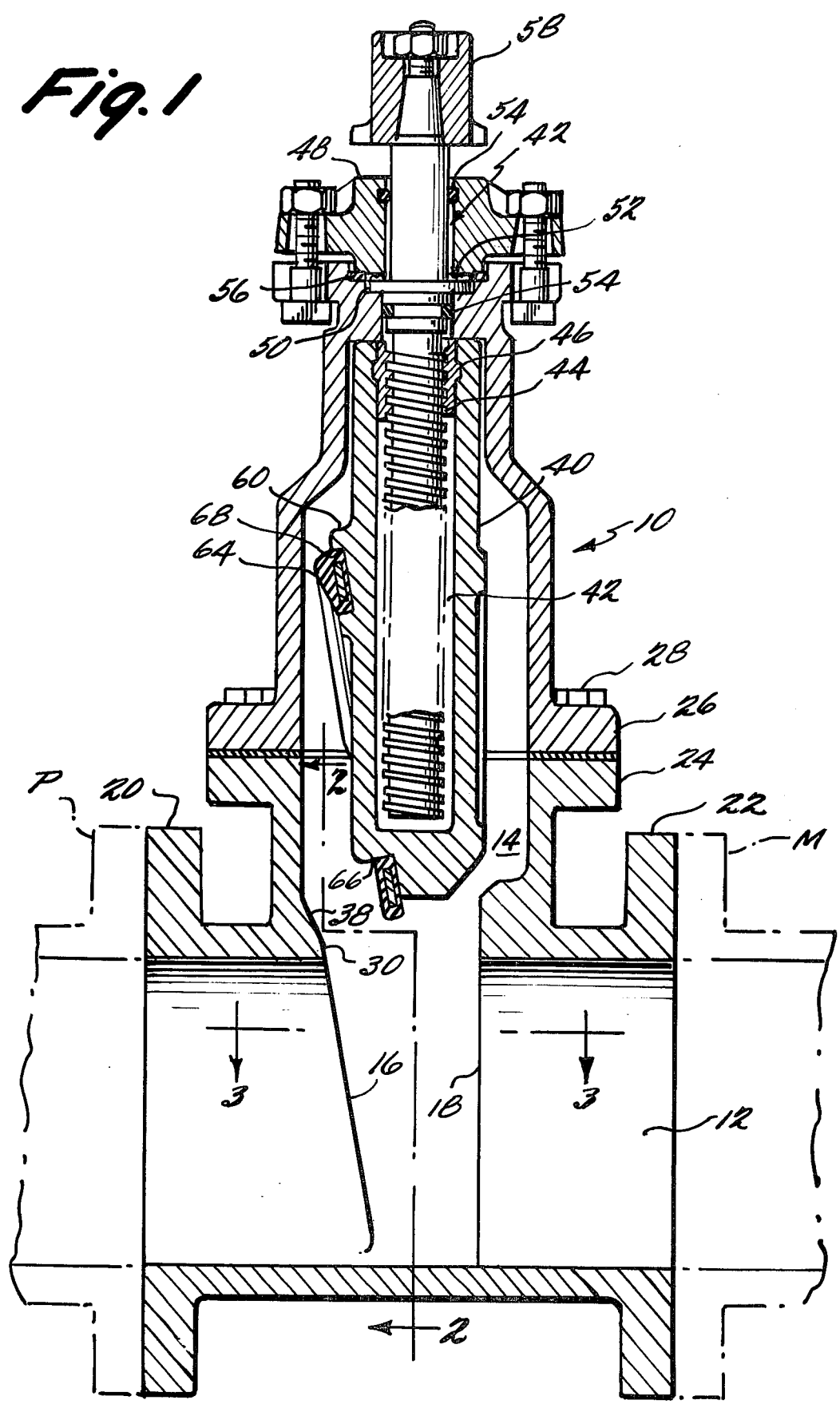
FIG. 1 is a vertical sectional view through the gate valve structure of the present invention taken on a plane parallel to the through-bore of the same and illustrating the gate member in the opened position, the valve stem operating mechanism being partially shown in elevation.

Referring now to the drawings wherein like characters or reference numerals represent like or similar parts, the gate valve structure of the present invention is generally illustrated in FIG. 1. In more detail, the gate valve structure includes a valve casing generally designated at 10, the valve casing being provided with a through-bore 12, a chamber 14 intersecting the through-bore 12 and defining ports 16 and 18 in the through-bore, and flanges 20 and 22 arranged to receive suitable means for attaching the gate valve structure to the pipes or mains P and M respectively shown in broken lines. The ports 16 and 18 may be inlet or outlet ports to the chamber 14 depending upon which way the gate valve structure is inserted into the fluid distribution system. In other words, the gate valve structure is a two-way structure as pressure of fluid in the fluid distribution system does not effect the sealing upon closing of the valve structure. The valve casing 10 may be of the conventional type in that it includes a lower body member 24 and a bonnet 26 attached thereto by means of bolts 28. Of course, the valve casing 10 could be of the type disclosed in the aforementioned U.S. Pat. No. 3,963,214 in which the casing is formed from two shell-like body members, the body members being attached to one another on a plane normal to the axis of the through-bore and to this extent the aforementioned patent is incorporated herein by reference.

Figure 2:
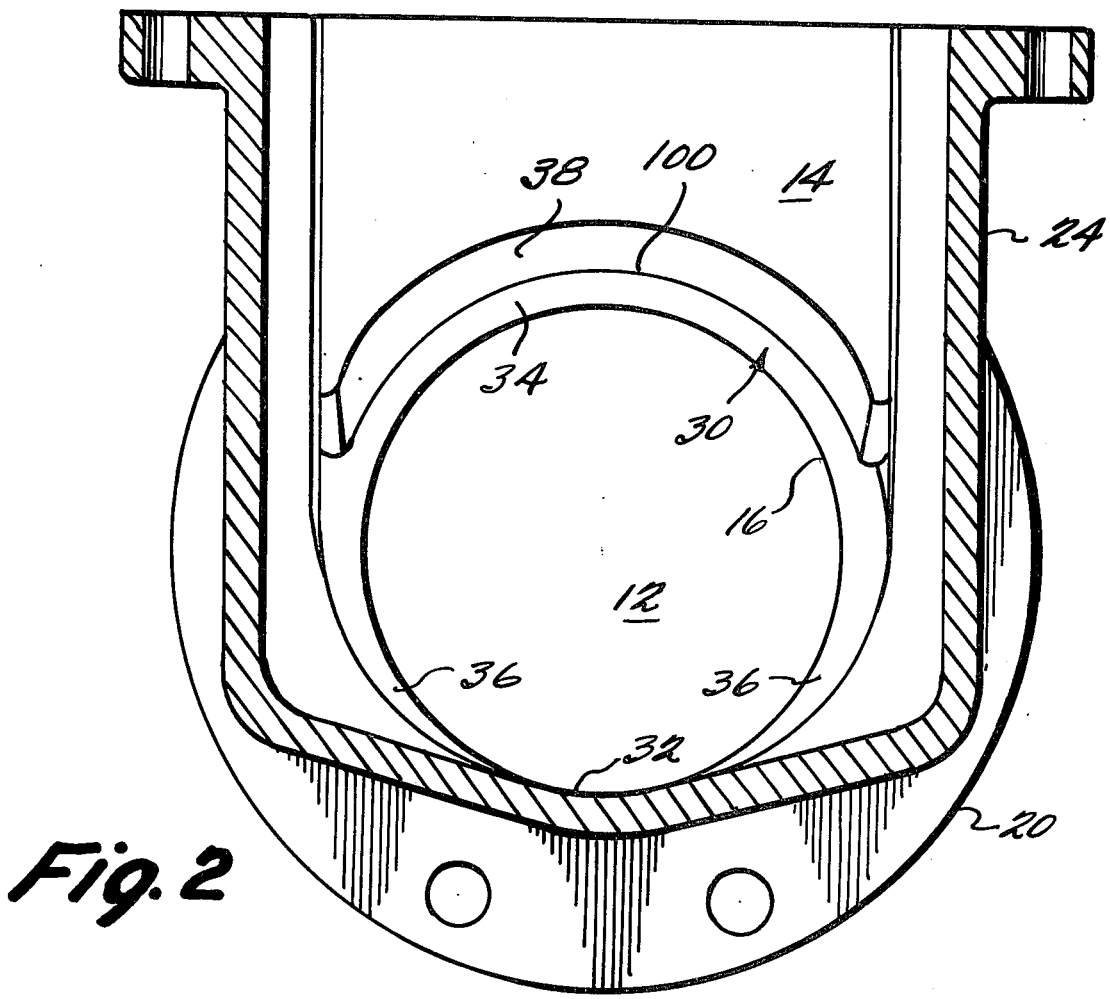
FIG. 2 is an enlarged vertical sectional view through the lower body member of the valve casing, the view being taken substantially on the line 2—2 of FIG. 1.

A valve seat 30, as best shown in FIG. 2 surrounds the port 16 of the through-bore 12 at a position where the through-bore is intersected by the chamber 14, the valve seat merging with the bottom portion of the through-bore as indicated at 32. Thus, it will be noted that the through-bore 12 has its bottom portion throughout its entire length completely unobstructed with no bottom cavity for receiving the gate member. Referring more to the valve seat 30, it will be noted by reference to FIGS. 1, 2 and 3 that the valve seat has an upper portion designated by the numeral 34 which is substantially planar and extends downwardly and merges in a transition portion 36 into the bottom portion 32 which defines a continuation of the through-bore. The planar surface 34 which faces the other port 18 extends generally on an acute angle to a plane normal to the axis of the through-bore 12 and preferably the angle is approximately 10 degrees. The wall surface of the chamber 14 which surrounds the outer periphery of the valve seat 30 adjacent its upper portion 34 is recessed sharply away from the plane of the valve seat by an angle of approximately 60 degrees, this recessed area being identified by the numeral 38 in FIGS. 1 and 2. A more detailed description of the purpose of the recess 38 will follow later in the specification.

Figure 10:
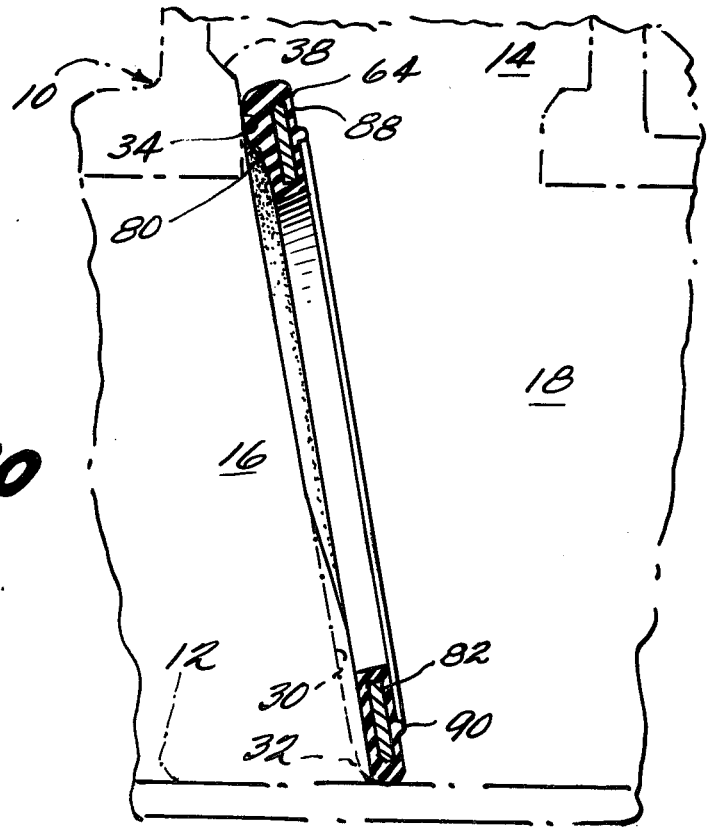
FIG. 10 is an enlarged vertical sectional view of the resilient annular seal member of the gate member, the view illustrating the seal member just prior to closing with the bulbous portion in contact with the valve seat, the valve seat and the valve casing being shown in broken lines.

Cooperating with the valve seat 30 is a gate or disc member 40, the gate or disc member 40 being reciprocated in the chamber 14 from an opened position (as shown in FIG. 1) to a closed position (as shown diagrammatically in FIG. 10) by valve stem means generally designated at 42. Before giving a detailed description of the gate member 40, a description will be given of the valve stem operating means 42.

As best shown in FIG. 1, the gate member 40 is provided with a chamber 42 open at its upper end for receiving a valve operating stem 44 which extends through an annular brass bushing 46. The bushing 46 is interiorly threaded to receive the exterior threads of the valve operating stem 44 and the valve operating stem extends upwardly and through a stuffing box 48 detachably secured to the upper end of the bonnet 26. It will now be appreciated that the valve illustrated is of the non-rising stem type, but of course, it could be of the rising stem if so desired.

In more detail, the stuffing box 48 entraps an annular flange 50 on the valve stem 44 with the usual anti-friction washer 52 being provided between the flange and the stuffing box. O-rings 54 are provided between the valve stem 44 and the bonnet 28 as well as between the valve stem 44 and the stuffing box 48 and a further stuffing box gasket 56 is provided between the stuffing box and the end of the bonnet. An operating nut 58 is carried on the end portion of the valve stem 44 extending out of the stuffing box 48, the operating nut being non-circular in external configuration as well as internal configuration, with the internal configuration being complementary to the non-circular end portion of the valve operating stem.

The gate member 40 is best shown in FIGS. 4 and 5 and it will be noted that it includes a cast body member 60 which is provided with an annular planar surface 62 for receiving an annular resilient seal member 64. In more detail, the annular planar surface 62 is provided about its radial inner periphery with a shoulder 66, the shoulder extending normal to the planar surface in a generally axial direction from the same. A further arcuate shoulder 68 is provided about a portion of the radial outer periphery of the planar surface 62 adjacent the top portion thereof, the shoulder 68 also extending normal to the planar surface 62 in a generally axial direction from the same. As will be appreciated by reference to FIGS. 1 and 5, the planar surface 62 lies in a plane extending at an acute angle to a horizontal axis of the disc, the angle of the planar surface 62 being in the order of 10 degrees.

The shoulders 66 and 68 function to restrain the seal member 64, the shoulder 66 restraining the radial inner periphery or edge of the seal member 64 whereas the shoulder 68 restrains only the upper portion of the outer radial periphery or edge of the seal member 64. The planar surface 62 of the body member 40 is provided with oppositely disposed recesses 70 at the circumferential ends of the arcuate shoulder 68. The purpose of the recesses 70 is to provide an area on the planar face surface 62 wherein material from the resilient seal member 64 can flow when the valve is being closed and the seal member 64 is engaging the upper planar portion 34 of the valve seat 30 by a wedging action. Without the recesses 70, there is no place for the flow of material and the sealing surface of the seal member 64 would be damaged on the circumferential ends of the annular shoulder 68.

A recess is provided in the annular shoulder 66 as indicated at 72. This recess 72 is offset from a horizontal or a vertical line through the planar surface 62 and is for the use in orienting the seal member 64 when it is assembled on the gate member 40.

Figure 7:
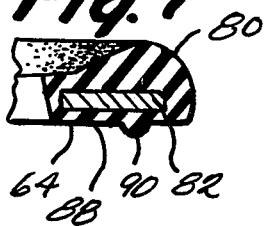
FIG. 7 is a sectional view taken substantially on the line 7—7 of FIG. 6.
Figure 8:
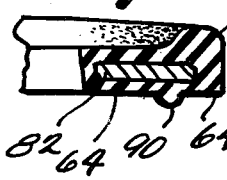
FIG. 8 is a sectional view taken substantially on the line 8—8 of FIG. 6 and illustrating the transition of the bulbous portion.
Figure 9:
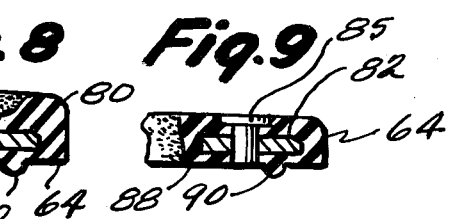
FIG. 9 is a sectional view taken substantially on the line 9—9 of FIG. 6.

Referring now to FIGS. 6 through 9 inclusive, it will be noted that the annular resilient seal member 64 is provided with a radially inwardly projecting tab 74 and this tab is discriminately located for cooperating with the recess 72 so that the seal member can only be placed onto the planar surface 62 of the body member 60 in one position. This is necessary due to the irregular shape of the bulbous portion of the seal member 64. As will be noted in FIG. 6, the line 76 represents a vertical axis whereas the line 78 represents a horizontal axis of the seal member 64 when it is positioned on the body member 60 of the gate member 40. The seal member 64 is generally rectangular in radial section but it has an annular bulbous portion extending axially therefrom, the bulbous portion being identified by the numeral 80. As shown in FIGS. 7, 8 and 9, the bulbous portion extends about the upper half of the seal member 64 and then it begins to merge into the rectangular shaped lower portion of the seal member 64 as shown in FIG. 9. The maximum axial thickness of the bulbous portion, when the seal member is mounted onto the planar surface 62 of the body member 60, lies in a plane through the vertical axis 76. As will be noted, this bulbous portion merges as shown in FIG. 8 until it flattens out into the generally rectangular radial section of the seal member.

The seal member is made of any suitable elastomeric material such as rubber, rubber-like materials, neoprene, plastics or the like, so long as the material has sufficient resiliency to provide a proper seal. A stainless steel, brass, or the like reinforcing ring 82 is embedded into the seal member 60 during molding of the same so as to give the same some rigidity and also to act as a bearing plate for the heads of screws 84 which extend through holes 85 in the same and are threaded into holes 86 tapped into the planar surface 62 of the body member 60. The back face 88 of the annular seal member is provided with an annular bead 90 which functions to smooth out when pressure is applied thereto by tightening of the screws 84. Of course, the screws can be discriminately tightened to apply different pressure at discrete points on the resilient annular seal member so that the seating of the same can be accurately adjusted for the particular seat of the particular valve in which it is installed. Additionally, after continued use of the valve and if it is desired, the screws may be further adjusted to re-adjust the seating capabilities of the valve.

Figure 3:
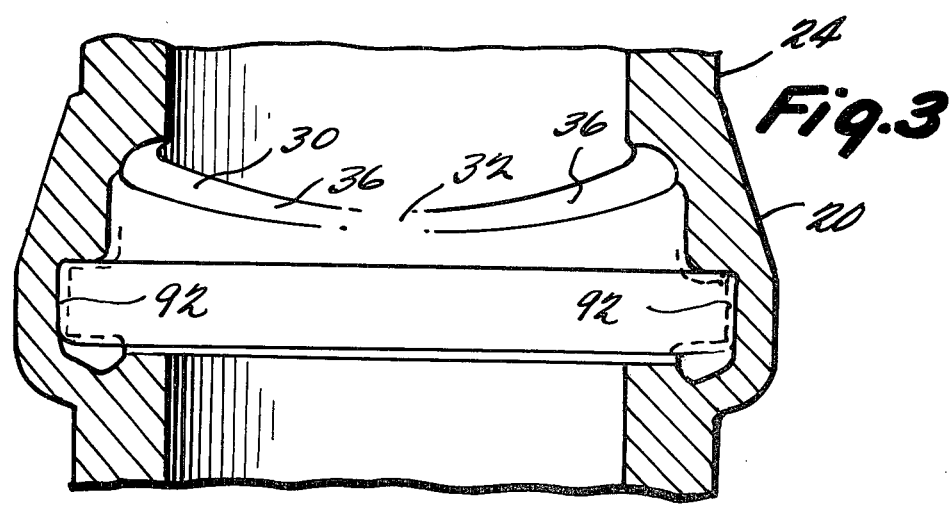
FIG. 3 is an enlarged fragmentary horizontal sectional view of the lower body member of the valve casing taken substantially on the line 3—3 of FIG. 1 and rotated 90 degrees clockwise.
Figure 6:
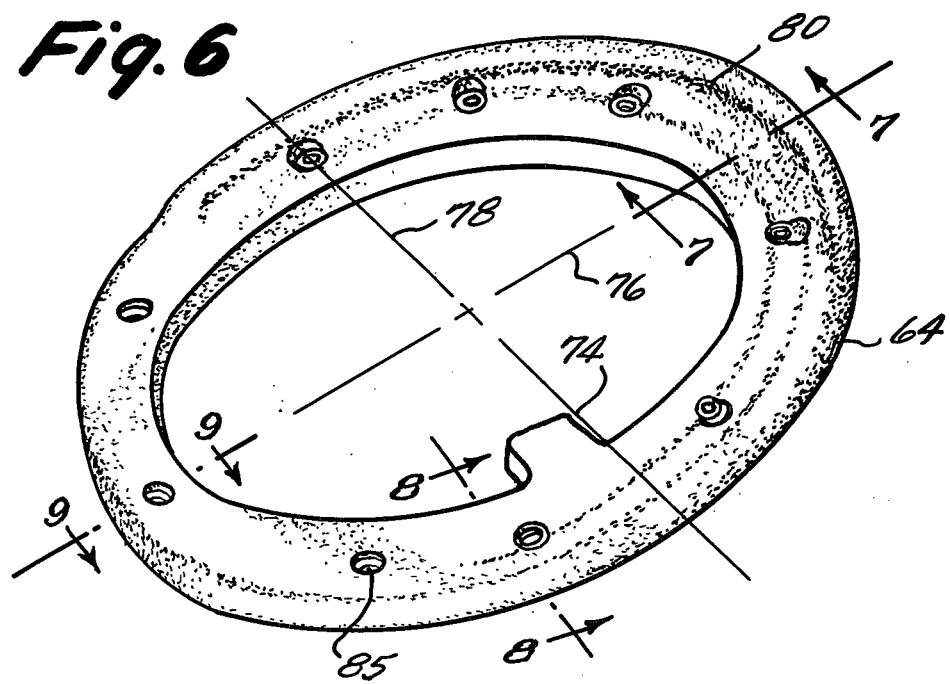
FIG. 6 is a perspective view of the resilient annular seal member of the gate member.

The chamber 14 of the valve casing 10 both in the body member 24 and bonnet 26 is provided with a pair of oppositely disposed guideways 92 as best shown in FIGS. 2 and 3. The guideways 92 are arranged to receive oppositely disposed and projecting ears 94 extending from the side edges of body member 60 of the gate member 40. The ears 94 are elongated and as shown in FIGS. 4 and 5, they extend almost to the bottom of the gate member 40 and the purpose of having the ears extend almost to the bottom of the gate member is so that when the valve is opened and closed, the flow of fluid, regardless of which direction it is from, does not cause excessive rocking of the gate member. In this respect, the width of the guideways 92 and the width of the ears is carefully controlled to eliminate as much play as possible of the gate member as it slides up and down in the substantially rectangular chamber 14.

While the body member 24 is cast with the guideways 92 therein, the seat 30 is machined and in the upper area thereof wherein there is the recessed surface 38, an edge 100 is provided. By providing the recessed surface 38 and also by shaping the annular resilient seal member so that the bulbous portion 80 thereof varies in its axial thickness, the lower portion of the annular seal does not drag across this edge 100 and, thus, the seal is not damaged upon continued opening and closing of the valve. Further, the provision of the recesses 70 in the planar surface 62 of the body member 60 of the gate member 40 prevent the annular resilient seal 64 from being damaged upon closing of the same wherein there is a wedging action of the bulbous portion 80 against the seat as the material of the annular seal member can flow into these recesses and, thus, the circumferential ends of the arcuate shoulder 68 do not dig into the surface of the seal member 64. These features are further enhanced by providing the seal member with means that make it impossible to incorrectly install the seal member 60 onto the body member 64. The seal member 64 is provided with the tab 74 which seats in the recess 72 and, thus, the bulbous portion is always correctly oriented and since the recess 72 is offset from the vertical, it is impossible to incorrectly place the seal member onto the body member.

It will be appreciated by those skilled in the art that the interior of the gate valve may be suitably coated with corrosive coatings dependent upon the fluid used in the fluid distribution system. Also, the material from which the valve casing is made can be selected to be compatible to the particular fluid of intended use for the gate valve.

The terminology used throughout this specification is for the purpose of description and not limitation, the scope of the invention being defined in the appended claims.

I claim:

1. A gate valve structure for use in mains carrying a fluid, said gate valve structure comprising:
   a valve casing having a through-bore for the flow of fluid, an elongated chamber intersecting said through-bore intermediate its ends and defining inlet and outlet ports to the chamber, and a valve seat in said casing surrounding one of said ports in said through-bore, said valve seat lying generally in a plane which converges at an acute angle to a plane normal to the axis of the through-bore, and said valve seat having an upper planar portion facing toward the other of said ports except at a bottom portion thereof where it merges into and forms a smooth and uninterrupted portion of said through-bore, said planar portion of said valve seat having an outer arcuate edge;
   a generally flat gate member reciprocable in said elongated chamber from a closed position across said through-bore and seating against said valve seat to an opened position out of said through-bore, said gate member including a body member having an annular planar surface lying generally in a plane converging at an acute angle to a plane normal to the axis of the through-bore and generally complementary to the plane of said valve seat, said planar surface of said body member being surrounded on its radially outer periphery adjacent its upper portion by an arcuate shoulder terminating in circumferentially spaced ends and extending axially from the body member, said planar surface being further provided on its radially inner periphery by an annular shoulder extending axially from the body member, an annular resilient seal member received on said planar surface and bounded by the annular shoulder and the arcuate shoulder, said annular seal member being generally rectangular in radial section and having an upper bulbous portion extending axially therefrom for engaging the upper portion of said valve seat facing the other of said ports, said bulbous portion of said seal member, when relaxed, having a maximum axial thickness adjacent its upper portion in a plane extending through an axis of movement of said gate member and merging into a minimum axial thickness of said seal member at its lower portion, said seal member with its bulbous portion defining a valve seat engaging portion complementary to said valve seat when said gate member is in the closed position, and said bulbous portion of said seal member preventing the lower portion of said seal member from dragging across said edge of said seat when said gate member is opened and closed;

means for retaining said seal member on the body member of said gate member; and valve stem means operatively connected to said gate member and extending through said valve casing, said valve stem means being operative to move said gate member between the closed and opened positions.

2. A gate valve structure as claimed in claim 1 including means to orient said annular seal member on said planar surface of said body member during assembly with its bulbous portion having its thickest radial section positioned in a plane extending normal to the body member and through the axis of movement of the gate member at the top of the planar surface.

3. A gate valve structure as claimed in claim 2 wherein said orienting means includes a radially inwardly projecting tab on said annular seal member and a recess provided in said annular shoulder for receiving the same.

4. A gate valve structure as claimed in claim 3 wherein said recess provided in said shoulder is offset circumferentially from a vertical and a horizontal axis through said planar surface and wherein said tab on said seal member is similarly offset whereby said seal member can be installed on said body member in one position only.

5. A gate valve structure as claimed in claim 1 wherein said seal member is provided with an annular reinforcing ring interiorly of the same and said means for retaining said seal member on the body member of the gate member includes circumferentially spaced screws extending through the reinforcing member into the body member of said gate member, said screws being capable of individual adjustment to cause said retaining ring to apply pressure at discrete positions on said seal member.

6. A gate valve structure as claimed in claim 1 including means on the body member of said gate member to accommodate for flow of said seal member in an area adjacent to the circumferential ends of said arcuate shoulder whereby said seal member avoids having its valve seat engaging portion damaged upon closing of said valve and axial compression of the upper portion of said seal member.

7. A gate valve structure as claimed in claim 6 in which said means includes recesses in said planar surface of the body member adjacent the circumferential ends of said arcuate shoulder.

8. A gate valve structure as claimed in claim 1 in which the acute angle of the upper planar portion of said valve seat is substantially in the order of 10 degrees, and wherein said annular resilient seal member has its bulbous portion arranged for wedging action with the upper planar portion of the valve seat upon closing of the valve with a remainder portion of the seal member being compressed by closing action of the valve.

9. A gate valve structure as claimed in claim 8 including providing a relief surface in said chamber upwardly and outwardly of said planar portion of said valve seat at an angle greater than the acute angle of said planar portion of said valve seat.

10. A gate valve structure as claimed in claim 9 including a pair of oppositely disposed groove-like guideways within said valve casing and extending from said through-bore into said chamber, a pair of oppositely disposed ears projecting from each side of said gate member and arranged in said guideways to guide said gate member during opening and closing movement of said valve, said ears and said guideways having a width dimensioned to ensure wedging action of said seal member during closing regardless of direction of the flow of fluid through said through-bore.

11. A gate valve structure as claimed in claim 10 in which said ears extend substantially to the bottom of the body of said gate member whereby rocking of said gate member during opening and closing is substantially eliminated.

12. A gate valve structure for use in mains carrying a fluid, said gate valve structure comprising:

a valve casing having a through-bore for the flow of fluid, an elongated chamber intersecting said through-bore intermediate its ends and defining inlet and outlet ports to the chamber, and a valve seat in said casing surrounding one of said ports in said through-bore, said valve seat lying generally in a plane which converges at an acute angle to a plane normal to the axis of the through-bore, and said valve seat having an upper planar portion facing toward the other of said ports except at a bottom portion thereof where it merges into and forms a portion of said through-bore;

a generally flat gate member reciprocable in said elongated chamber from a closed position across said through-bore and seating against said valve seat to an opened position out of said through-bore, said gate member including a body member having an annular planar surface lying generally in a plane converging at an acute angle to a plane normal to the axis of the through-bore and generally complementary to the plane of said valve seat, said planar surface of said body member being surrounded on its radially outer periphery adjacent its upper portion by an arcuate shoulder terminating in circumferentially spaced ends and extending generally axially from said body member, said planar surface being further provided on its radially inner periphery by an annular shoulder extending generally axially from said body member, an annular resilient seal member received on said planar surface and bounded by said arcuate shoulder and said annular shoulder, said annular seal member being generally rectangular in radial section and having an upper bulbous portion extending axially therefrom for engaging the upper portion of said valve seat facing the other of said ports, said bulbous portion of said seal member, when relaxed, having a maximum axial thickness adjacent its upper portion in a plane extending through an axis of movement of said gate member and merging into a minimum axial thickness at its lower portion, said seal member with its bulbous portion defining a valve seat engaging portion complementary to said valve seat when said gate member is in the closed position;

means for retaining said seal member on the planar surface of said body member of said gate member;

means on said body member of said gate member to accommodate for flow of said seal member in an area adjacent to the circumferential ends of said arcuate shoulder, said means including recesses in said planar surface of said body member adjacent the circumferentially spaced ends of said arcuate shoulder whereby flow of said seal member is accommodated to avoid said seal member having its valve seat engaging portion damaged upon closing of said valve and axial compression of the upper bulbous portion of said seal member; and valve stem means operatively connected to said gate member and extending through said valve casing, said valve stem means being operative to move said gate member between the closed and open positions.

13. A gate valve structure as claimed in claim 12 including means to orient said annular seal member on said planar surface of said body member during assembly with its bulbous portion having its thickest radial section positioned in a plane extending normal to the body member and through the axis of movement of the gate member at the top of the planar surface.

14. A gate valve structure as claimed in claim 13 wherein orienting means includes a radially inwardly projecting tab on said annular seal member and a recess provided in said annular shoulder for receiving the same.

15. A gate valve structure as claimed in claim 14 wherein said recess in said shoulder and said tab on said seal member are oriented in a position whereby said seal member can be installed on said body member in one position only.

16. A gate valve structure for use in mains carrying a fluid, said gate valve structure comprising:

a valve casing having a through-bore for the flow of fluid, an elongated chamber intersecting said through-bore intermediate its ends and defining inlet and outlet ports to the chamber, and a valve seat in said casing surrounding one of said ports in said through-bore, said valve seat lying generally in a plane which converges at an acute angle to a plane normal to the axis of the through-bore, and said valve seat having an upper planar portion facing toward the other of said ports except at a bottom portion thereof where it merges into and forms a portion of said through-bore;

a generally flat gate member reciprocable in said elongated chamber from a closed position across said through-bore and seating against said valve seat to an opened position out of said through-bore, said gate member including a body member having an annular planar surface lying generally in a plane converging at an acute angle to a plane normal to the axis of the through-bore and generally complementary to the plane of said valve seat, said planar surface of said body member being surrounded on its radially outer periphery adjacent its upper portion by an arcuate shoulder terminating in circumferentially spaced ends and extending generally axially from said body member, said planar surface being further provided on its radially inner periphery by an annular shoulder extending generally axially from said body member, an annular resilient seal member received on said planar surface and bounded by said arcuate shoulder and said annular shoulder, said annular seal member being generally rectangular in radial section and having an upper bulbous portion extending axially therefrom for engaging the upper portion of said valve seat facing the other of said ports, said bulbous poriton of said seal member, when relaxed, having a maximum axial thickness adjacent its upper portion in a plane extending through an axis of movement of said gate member and merging into a minimum axial thickness at its lower portion, said seal member with its bulbous portion defining a valve seat engaging portion complementary to said valve seat when said gate member is in the closed position;

means for retaining said seal member on the planar surface of said body member of said gate member;

means to orient said annular seal member on said planar surface of said body member during assembly with its bulbous portion having its thickest radial section positioned in a plane extending normal to said body member and through the axis of movement of said gate member at the top of said planar surface, said orienting means including a radially projecting tab on said annular seal member and a recess provided in one of said annular shoulder and arcuate shoulder for receiving said tab.

17. A gate valve structure as claimed in claim 16 wherein said radially projecting tab projects inwardly of said annular seal member and said recess is provided in said annular shoulder.

18. A gate valve structure as claimed in claim 17 wherein said recess provided in said shoulder is offset circumferentially from a vertical and a horizontal axis through said planar surface and wherein said tab on said seal member is similarly offset whereby said seal member can be installed on said body member in one position only.

19. A gate valve structure for use in mains carrying a fluid, said gate valve structure comprising:

a valve casing having a through-bore for the flow of fluid, an elongated chamber intersecting said through-bore intermediate its ends and defining inlet and outlet ports to the chamber, and a valve seat in said casing surrounding one of said ports in said through-bore, said valve seat lying generally in a plane which converges at an acute angle to a plane normal to the axis of the through-bore, and said valve seat having an upper planar portion facing toward the other of said ports except at a bottom portion thereof where it merges into and forms a smooth and uninterrupted portion of said through-bore, said planar portion of said valve seat having an outer arcuate edge;

a generally flat gate member reciprocable in said elongated chamber from a closed position across said through-bore and seating against said valve seat to an opened position out of said through-bore, said gate member including a body member provided with an annular planar surface, an annular resilient seal member being received on said planar surface of said body member, said annular seal member having a surface for engaging the planar surface of said body member, said surface of said seal member being provided with an annular bead to insure a seal with the planar surface of said body member when said seal member is held on said body member, said annular resilient seal member further being generally rectangular in radial section and having an upper bulbous portion extending axially therefrom for engaging the upper portion of said valve seat facing the other of said ports, said bulbous portion of said seal member, when relaxed, having a maximum axial thickness adjacent its upper portion in a plane extending through an axis of movement of said gate member and merging into a minimum axial thickness of said seal member at its lower portion, said seal member with its bulbous portion defining a valve seat engaging portion complementary to said valve seat when said gate member is in the closed position, and said bulbous portion of said seal member preventing the lower portion of said seal member from dragging across said edge of said seat when said gate member is opened and closed;

means for retaining said seal member on the body member of said gate member; and valve stem means operatively connected to said gate member and extending through said valve casing, said valve stem means being operative to move said gate member between the closed and opened positions.

20. A gate valve structure as claimed in claim 19 in which said annular seal member includes a rigid annular reinforcing ring embedded therein and said means for retaining said seal member on said body member includes circumferentially spaced screws extending through the reinforcing ring into the body member and capable of individual adjustment to cause the reinforcing ring to apply pressure at discrete positions on said seal member.

* * * * *